United States Patent
Hsu

(10) Patent No.: US 7,515,209 B2
(45) Date of Patent: *Apr. 7, 2009

(54) METHODS OF NOISE REDUCTION AND EDGE ENHANCEMENT IN IMAGE PROCESSING

(75) Inventor: Chuan-Chang Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,609

(22) Filed: May 6, 2008

(65) Prior Publication Data

US 2008/0205787 A1    Aug. 28, 2008

Related U.S. Application Data

(63) Continuation of application No. 11/000,671, filed on Nov. 30, 2004, now Pat. No. 7,388,621.

(51) Int. Cl.
*H04N 5/21* (2006.01)
*G06K 9/48* (2006.01)

(52) U.S. Cl. .................................. 348/606; 382/266

(58) Field of Classification Search ................ 348/606, 348/607, 625, 701; 382/260, 266, 275; 358/3.27, 358/3.26; 345/611
See application file for complete search history.

(56) References Cited

U.S. PATENT DOCUMENTS

| | | | |
|---|---|---|---|
| 5,561,724 A | | 10/1996 | Kido et al. |
| 5,852,475 A | | 12/1998 | Gupta et al. |
| 5,920,356 A | * | 7/1999 | Gupta et al. ................. 348/606 |
| 5,959,693 A | | 9/1999 | Wu et al. |
| 6,721,016 B1 | | 4/2004 | Hamajima |
| 6,771,320 B2 | | 8/2004 | Choi |
| 7,079,287 B1 | * | 7/2006 | Ng et al. ....................... 358/2.1 |
| 7,098,964 B2 | * | 8/2006 | Rieder et al. ................. 348/627 |
| 7,167,594 B2 | | 1/2007 | Ruol et al. |
| 7,388,621 B2 | * | 6/2008 | Hsu ............................. 348/606 |
| 2003/0156222 A1 | | 8/2003 | Weston et al. |
| 2004/0085458 A1 | | 5/2004 | Yanof et al. |
| 2004/0190787 A1 | | 9/2004 | Nakami |
| 2005/0008251 A1 | | 1/2005 | Chiang |
| 2006/0020203 A1 | | 1/2006 | Tamura |

OTHER PUBLICATIONS

CN Office Action mailed Mar. 30, 2007 as cited in parent application.

* cited by examiner

*Primary Examiner*—Victor R Kostak
(74) *Attorney, Agent, or Firm*—Thomas, Kayden, Horstmeyer & Risley

(57) ABSTRACT

Methods of noise reduction and edge enhancement in image processing. An exemplary method comprises extracting a plurality of pixels from the video signal, evaluating measures of edge existence in a plurality of directions within the extracted pixels, determining a level of variation from the measures of edge existence, mapping the level of variation to a first and second control signal in accordance with a predetermined function, performing noise reduction on the extracted pixels according to the first control signal, and performing edge enhancement on the extracted pixels according to the second control signal.

20 Claims, 7 Drawing Sheets

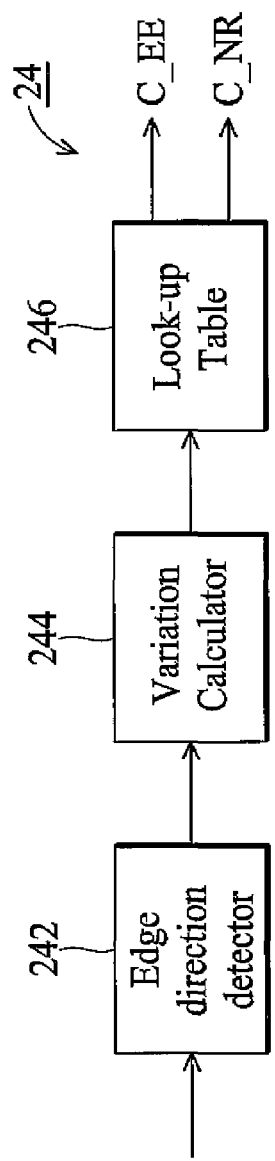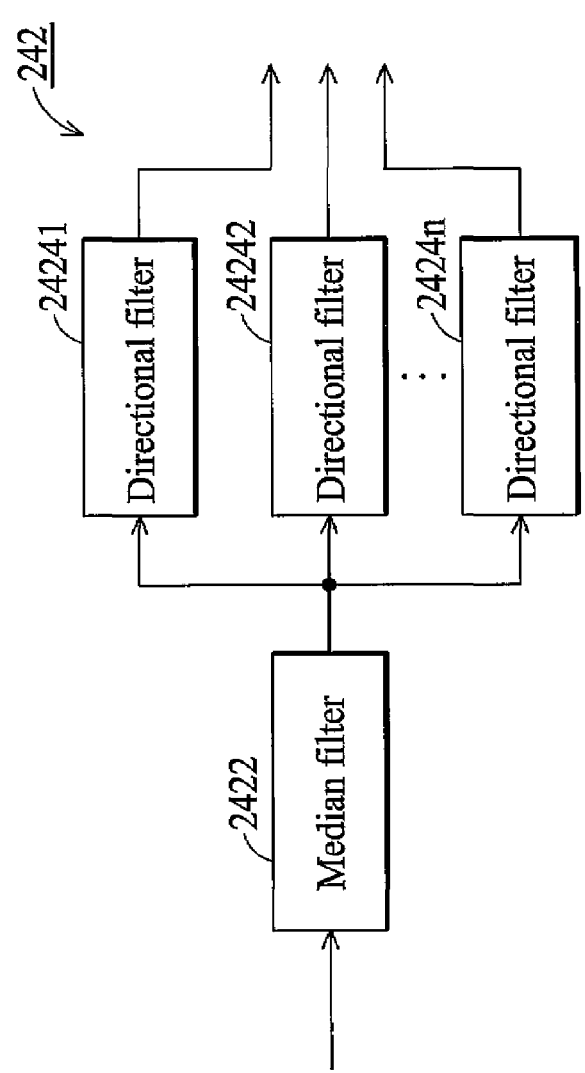

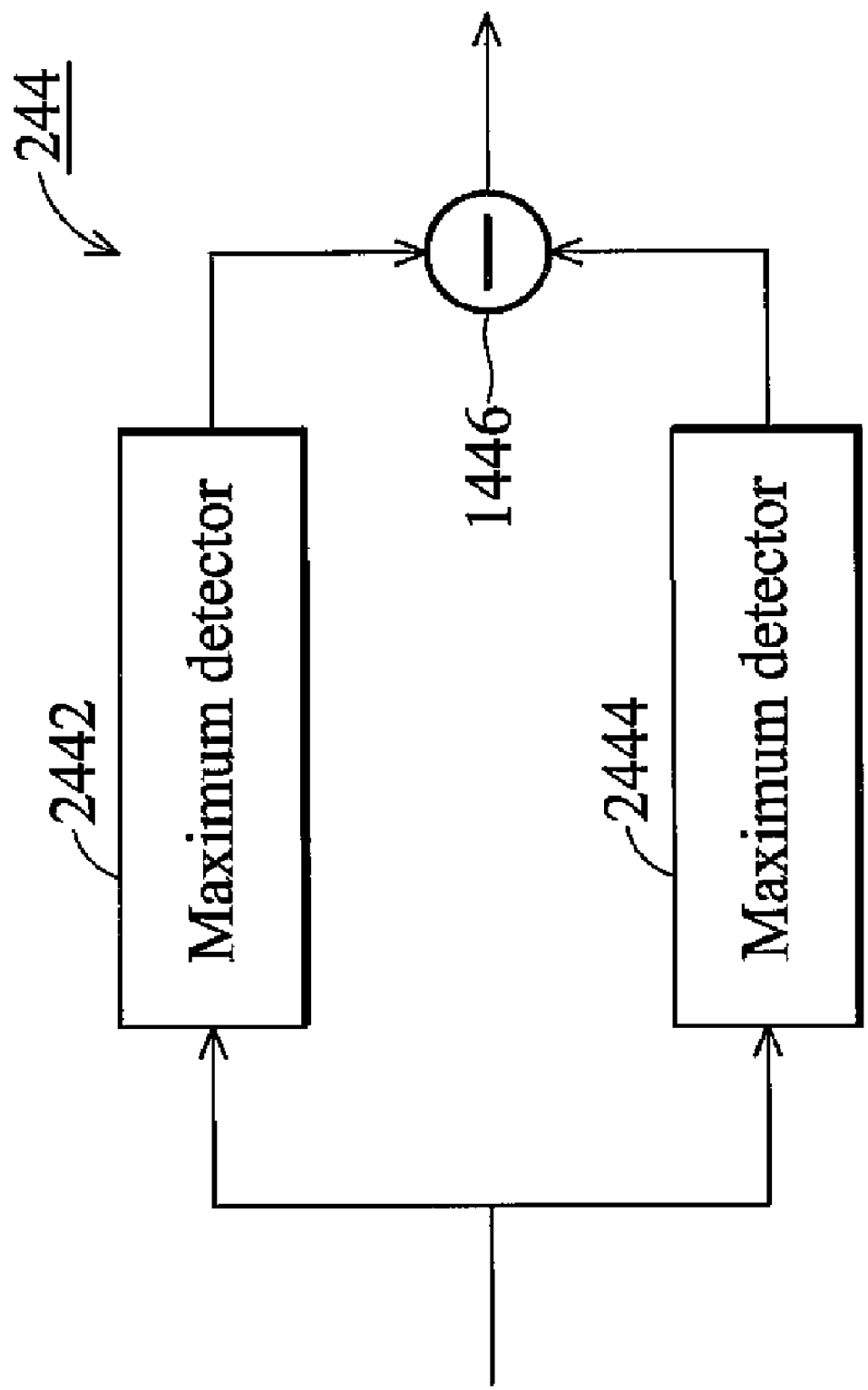

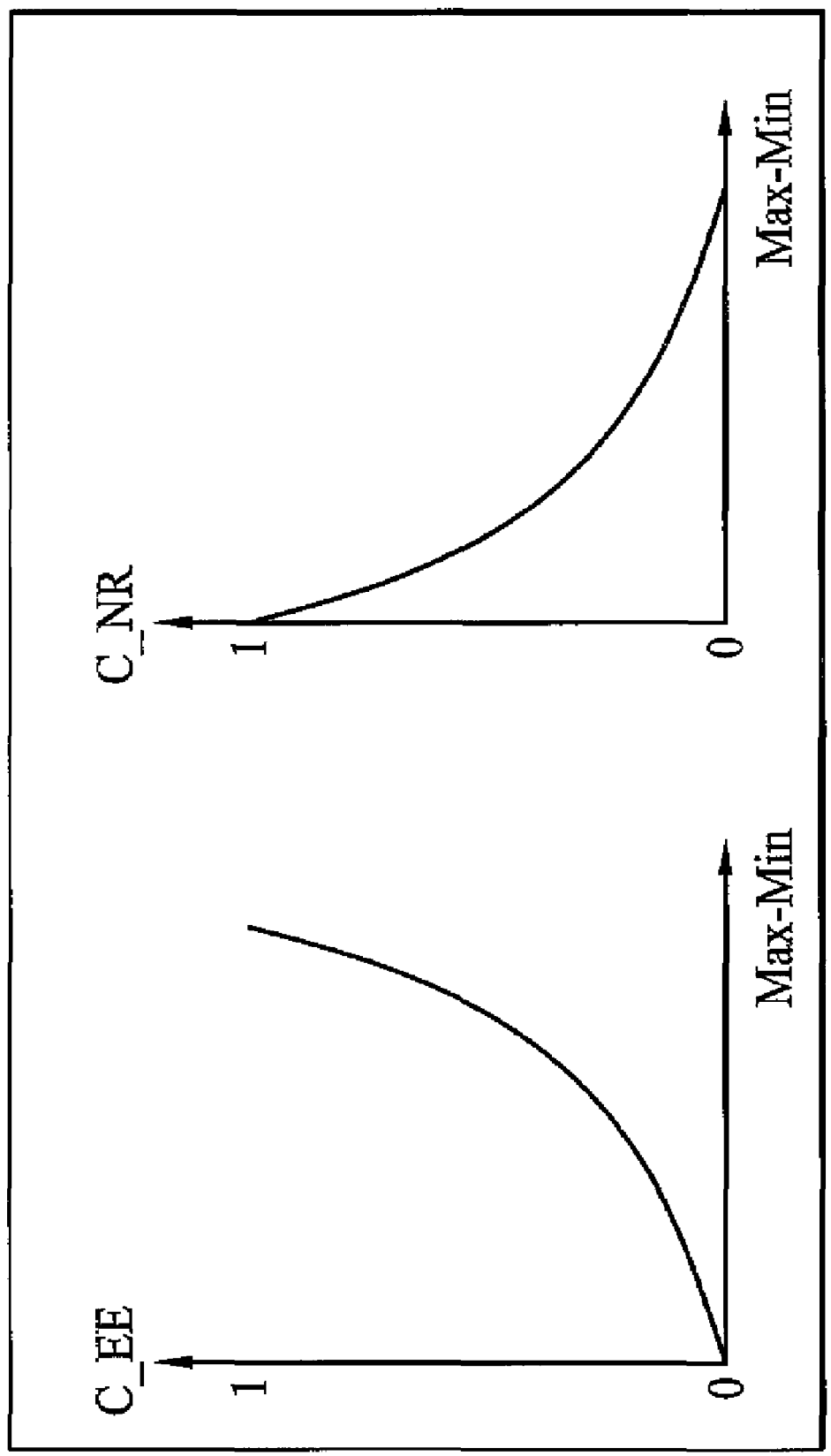

US 7,515,209 B2

METHODS OF NOISE REDUCTION AND EDGE ENHANCEMENT IN IMAGE PROCESSING

CROSS-REFERENCE TO RELATED APPLICATION

This application is a continuation of copending application Ser. No. 11/000,671, filed Nov. 30, 2004.

BACKGROUND

The invention relates to image processing methods and systems for video signals, and more specifically, to image processing methods and systems providing video noise reduction and edge enhancement.

In image signal processing, reduction of noise and edge enhancement are two important processes. Video signal bandwidth is typically limited as the video signals are compressed by JPEG or MPEG for transmission. Compressed video signals can lose image edges or so called details of image as high frequency components of the signals are attenuated. Noise reduction usually involves averaging, suppression, or blurring, and edge enhancement usually involves an unsharp masking or Laplacian filter (or a high pass filter). Image processing methods for noise reduction usually entail smearing of details, whereas methods for edge enhancement usually enhance unwanted noise and edges simultaneously. The two processes are difficult to reconcile as the noise reduction process requires a further reduction of the video signal band and removal of high frequency components while the edge enhancement process requires increased high frequency components of the signals. A preferred solution is to discriminate noises from edges in image processing such that details can be preserved after noise reduction and only edges are enhanced in edge enhancement.

A video signal processing circuit disclosed in U.S. Pat. No. 5,926,577 performs noise reduction and edge enhancement without considering edge information in the noise reduction process, to reference to prevent details from smearing. Furthermore, noisy signals are provided to the input of the horizontal and vertical edge enhancement signal generation circuits, causing both noise and edge to be enhanced. In U.S. Pat. No. 5,757,977, a fuzzy logic filter detects edge directions and noise level, and selects a most probable edge direction for edge enhancement without discrimination between smooth areas and areas with edge. The strategy of choosing the most probable edge direction for edge enhancement may not be appropriate for each image area, since, for example, edge enhancement may readily enhance noise in image areas belong to smooth area.

SUMMARY

Methods of noise reduction and edge enhancement in image processing are provided. An exemplary embodiment of image processing method providing noise reduction and edge enhancement comprises the acts of: extracting a plurality of pixels from the video signal, evaluating measures of edge existence in a plurality of directions within the extracted pixels, determining a level of variation from the measures of edge existence, mapping the level of variation to a first and second control signal in accordance with a predetermined function, performing noise reduction on the extracted pixels according to the first control signal, and performing edge enhancement on the extracted pixels according to the second control signal.

An exemplary embodiment of noise reduction and edge enhancement method suitable for image processing comprises the acts of: extracting a plurality of pixels from a video signal, measuring an edge tendency within the extracted pixels, mapping the edge tendency to a control signal in accordance with a non-decreasing function, performing noise reduction on the extracted pixels according to the control signal, and performing edge enhancement on the extracted pixels according to the control signal.

Another exemplary embodiment of noise reduction and edge enhancement method suitable for image processing comprises the acts of: extracting a plurality of pixels from a video signal, measuring an edge tendency within the extracted pixels, mapping the edge tendency to a first and second control signal in accordance with a predetermined function, performing noise reduction on the extracted pixels according to the first control signal, and performing edge enhancement on the extracted pixels according to the second control signal.

DESCRIPTION OF THE DRAWINGS

The invention can be more fully understood by reading the subsequent detailed description in conjunction with the examples and references made to the accompanying drawings, wherein:

FIG. 4 is a schematic diagram illustrating an embodiment of a variation detector.

FIG. 5 is a schematic diagram illustrating an embodiment of an edge direction detector.

FIG. 7 is a schematic diagram illustrating an embodiment of a variation calculator.

FIG. 8 shows the relationships between the difference (Max−Min) and the two control signals C_EE and C_NR.

DETAILED DESCRIPTION

Figure 1:
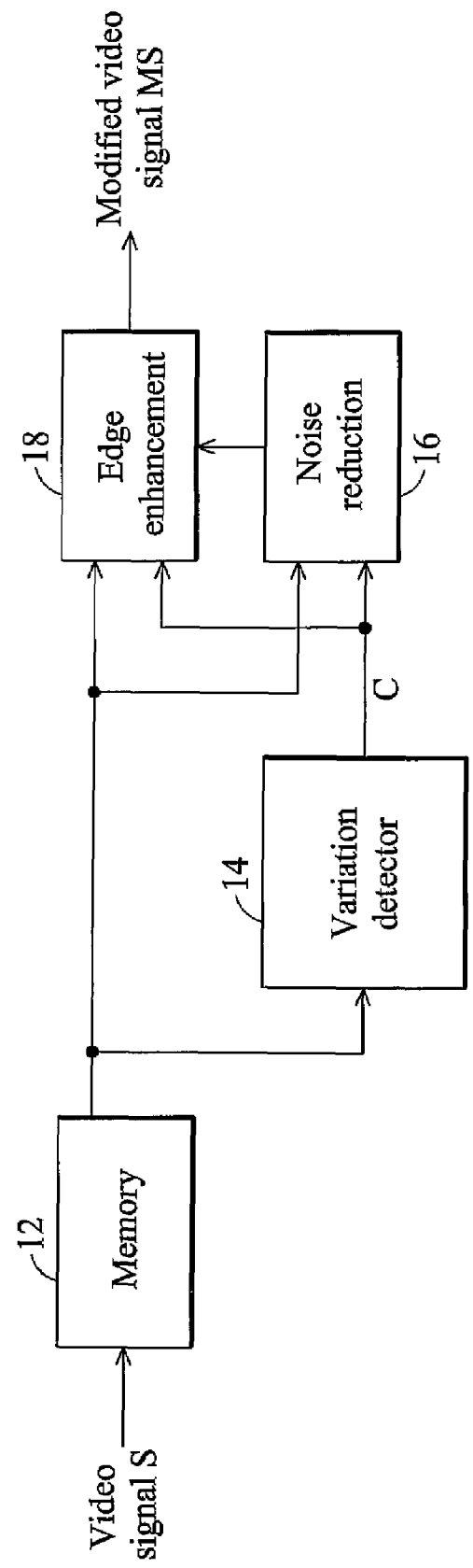
FIG. 1 is a schematic diagram illustrating an embodiment of an image processing system for noise reduction and edge enhancement.

Image processing methods, systems, and video player devices providing noise reduction and edge enhancement are provided. FIG. 1 is a block diagram illustrating an embodiment of an image processing system. The image processing system comprises a memory 12, a variation detector 14, a noise reduction circuit 16, and an edge enhancement circuit 18. The memory 12 buffers and delays a video signal S for one or more line periods. The variation detector 14 measures probabilities or likelihood of edge existence in predetermined directions, and generates a control signal C indicating a level of variations on the set of probabilities. Low variation indicates little edge tendency and the high frequency components are expected noises. High variation indicates a strong edge tendency. The control signal C is provided to the noise reduction and edge enhancement circuits 16 and 18 to control filtering and edge enhancement. The noise reduction circuit 16 filters the video signal output from the memory 12 according to the control signal, generating a noise reduced video signal to the edge enhancement circuit 18 to produce a modified video signal MS.

Figure 2:
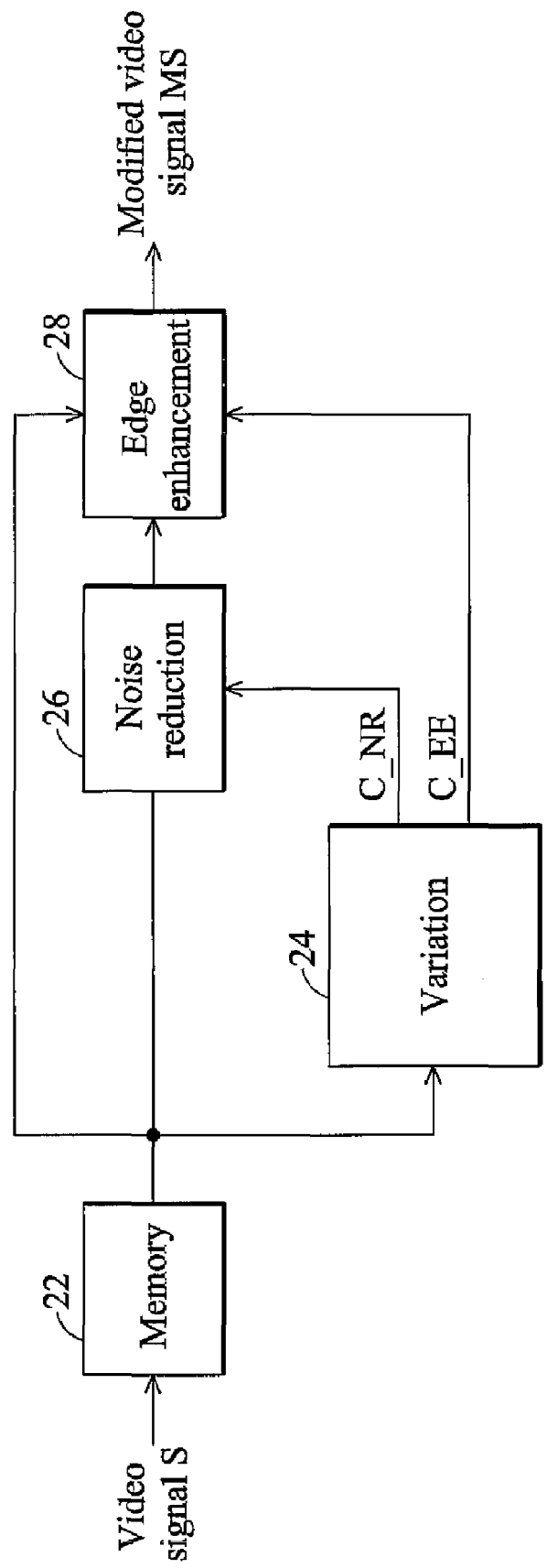
FIG. 2 shows another image processing system for noise reduction and edge enhancement.

FIG. 2 shows another image processing system for executing noise reduction and edge enhancement for a video signal. The image processing system comprises a memory device 22, a variation detector 24, a noise reduction circuit 26, and an edge enhancement circuit 28. The memory buffers a target pixel and reference pixels in the video signal. The variation detector 24 determines a control signal C_NR for noise reduction and a control signal C_EE for edge enhancement, provided to the noise reduction circuit 26 and edge enhancement circuit 28 respectively.

Figure 3A:
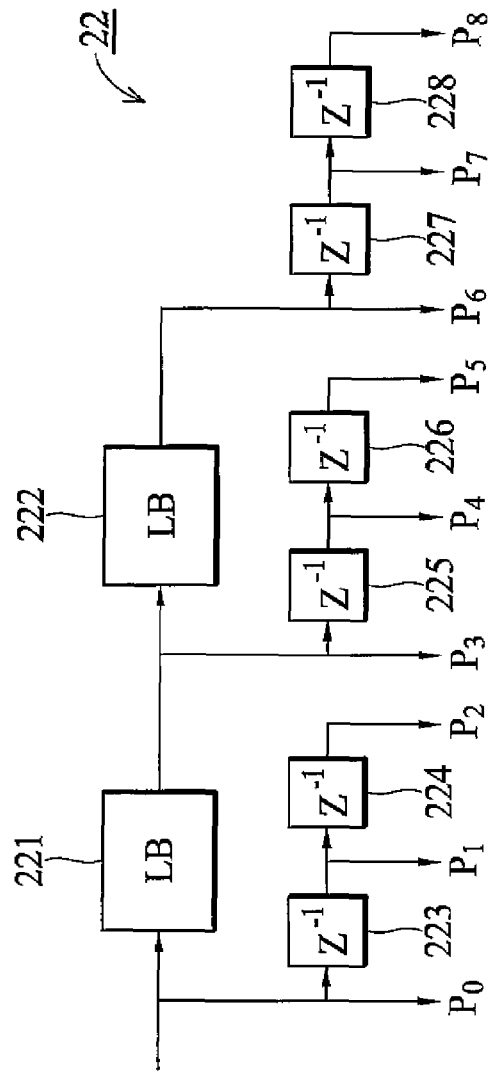
FIG. 3a shows an embodiment of a memory device buffering and delaying 9 pixels in a video signal, performing noise reduction and edge enhancement on a target pixel.
Figure 3B:
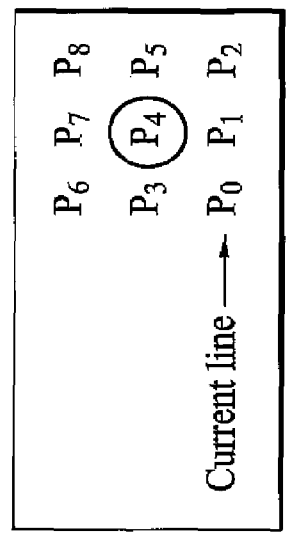
FIG. 3b shows the relationship between a target pixel and the eight neighbor pixels in the video signal.

FIG. 3a shows an embodiment of a memory device 22 buffering and delaying 9 pixels in a video signal S performing noise reduction and edge enhancement on a target pixel P4. FIG. 3b shows the relationship between the target pixel $P_4$ and eight neighbor pixels $P_0 \sim P_3$, $P_5 \sim P_8$ in the video signal S. The neighbor pixels are also referred to as reference pixels of the target pixel. The memory device 22 comprises two line buffers (LB) 221 and 222, and six pixel buffers 223~228 for buffering pixels $P_0 \sim P_8$. The buffered pixels are provided to the variation detector, noise reduction circuit, and edge enhancement circuit.

Variation detector 24 may comprise an edge direction detector 242, a variation calculator 244, and a look-up table 246 as shown in FIG. 4. The edge direction detector 242 measures probabilities of edge existence in predetermined directions, and the variation calculator 244 calculates a level of variation v. The look-up table 246 maps the level of variation v output from the variation calculator 244 to locate control signals C_EE and C_NR according to a non-decreasing function and a non-increasing function respectively. Equation (1) is an example of the non-decreasing mapping function, and equation (2) is an example of the non-increasing mapping function, wherein C is a constant.

$$1 - \frac{1}{\sqrt{1 + c \times v^2}} \quad \text{Equation (1)}$$

$$\frac{1}{\sqrt{1 + c \times v^2}} \quad \text{Equation (2)}$$

Figure 6:
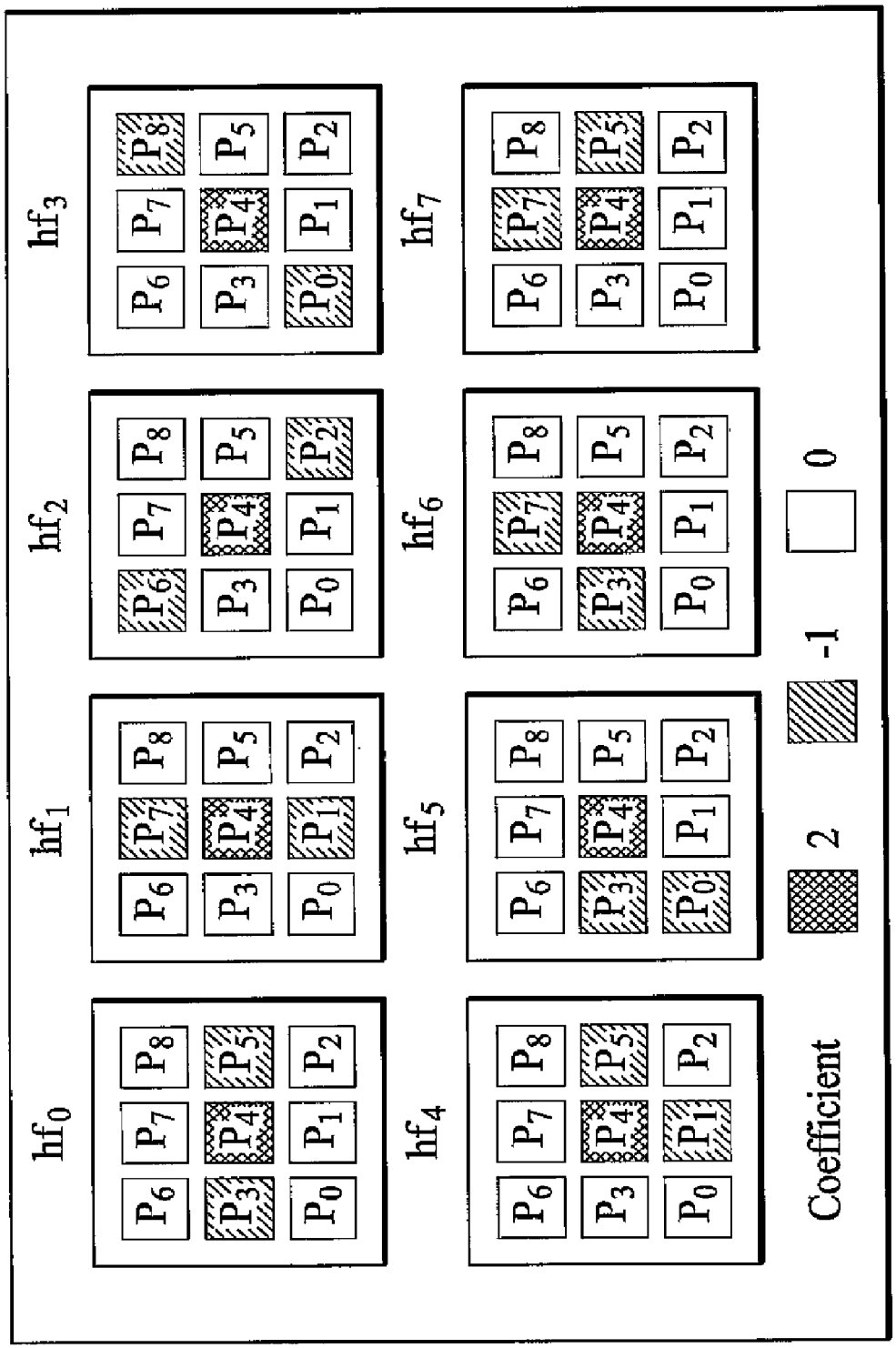
FIG. 6 illustrates an example of a set of eight directional filters when the memory provides a target pixel $P_4$ and eight neighbor pixels $P_0$~$P_3$, $P_5$~$P_8$ to the directional filters as shown in FIG. 3b.

The edge direction detector 242 may be implemented by a median filter 2422 and n directional filters 24241~2424n as shown in FIG. 5. The median filter 2422 reduces the influence of noises on detection of edge existence by replacing the original value of a target pixel with a median of the target pixel and predetermined neighbor pixels of the target pixel. The predetermined neighbor pixels here are the eight nearest pixels to the target pixel. The median filter 2422 then outputs the median to the n directional filters 24241~2424n, and each directional filter measures the likelihood of edge existence in a predetermined direction. FIG. 6 illustrates an example of a set of eight directional filters when the memory provides a target pixel $P_4$ and eight neighbor pixels $P_0 \sim P_3$, $P_5 \sim P_8$ to the directional filters as shown in FIG. 3b. Each directional filter $hf_0 \sim hf_7$ detects a correlation between three pixels forming an edge pattern. The correlation is calculated by multiplying a set of coefficients, for example, {−1, 2, −1}, to the three pixels. The output of the directional filter $hf_0$ equals the absolute value of −1×p3+2×p4−1×p5, which indicates the correlation of the target pixel p4 with respect to the horizontal direction. Similarly, the output of the directional filter $hf_1$ equals the absolute value of −1×p7+2×p4−1×p1, which indicates the correlation of the target pixel p4 with respect to the vertical direction.

The variation calculator 244 of FIG. 4 comprises a maximum detector 2442 and a minimum detector 2444, which detect the maximum and minimum value of a set of correlations provided by the edge direction detector 242. The subtractor 1446 calculates and outputs a difference between the maximum and minimum values detected by the maximum 2442 and minimum 2444 detectors respectively. The difference is the level of variation, an indication of the likelihood of edge existence. A large difference indicates that the set of correlations contains a significant amount of edge orientation information, and a small difference indicates that the set of correlations contains an insignificant amount of edge orientation information. The difference (Max−Min) is provided to the look-up table for selecting control signals C_EE for edge enhancement and C_NR for noise reduction. FIG. 8 is two graphs illustrating the relationships between the difference (Max−Min) and the two control signals C_EE and C_NR. A greater difference implies an edge is more likely, thus mapping to a larger control signal C_EE for edge enhancement, and a smaller control signal C_NR for noise reduction.

The amount of noise reduction is responsive to the control signal C_NR, and a larger degree of filtering is applied to the input of the noise reduction circuit for a smaller control signal C_NR. The noise reduction circuit may perform the calculation shown in Equation (3) to alter the value of the target pixel P4.

$$P4 = P4 - NGain \times C\_NR \times \left( P4 - \frac{P0 + P1 + P2 - P3 + P5 + P6 + P7 + P8}{8} \right) \quad \text{Equation (3)}$$

NGain, a noise reduction gain, and the noise reduction control signal C_NR determine the signal strength attenuation for the target pixel P4. If the level of variation is zero (for example, the difference Max−Min=0), P4 is likely to be located in a smooth area and the control signal C_NR is equal to 1, there is no inhibition of noise reduction in this case. When the level of variation increases, the control signal C_NR decreases rapidly toward zero with the level of noise reduction decreasing accordingly. The noise reduction circuit does not alter the target pixel P4 if the control signal C_NR equals to zero.

Edge enhancement is responsive to the control signal C_EE, with more edge enhancement applied for a larger control signal C_EE. The edge enhancement circuit may perform the calculation shown in Equation (4) to alter the target pixel P4.

$$P4 = P4 + EGain \times C\_EE \times \left( P4 - \frac{P0 + P1 + P2 + P3 + P5 + P6 + P7 + P8}{8} \right) \quad \text{Equation (4)}$$

EGain is an edge enhancement gain. When the level of variation is zero, the control signal C_EE is equal to 0, there is no edge enhancement as the target pixel is determined to be in a smooth area. When the level of variation increases, the control signal C_EE increases rapidly toward 1 such that the level of edge enhancement increases accordingly.

The set of directional filters determining the correlations of the predetermined directions can be replaced by any combination of direction detection circuits capable of detecting the probabilities or likelihood of edge existence. The variation calculator may be implemented using an entropy calculator calculating the entropy on the set of probabilities. High entropy values indicate little knowledge about the edge orientation and lower entropy values indicate significant knowledge of edge orientation. The probability $Pb_0$ that the target pixel P4 belongs to an edge formed by P3, P4, P5 (horizontal direction as shown in FIG. 6) can be calculated by Equation (5).

$$Pb_0 = \frac{hf_0}{hf_0 + hf_1 + hf_2 + hf_3 + hf_4 + hf_5 + hf_6 + hf_7} \quad \text{Equation (5)}$$

The other seven probabilities $Pb_1$~$Pb_7$ can be calculated using a similar equation and the entropy of the set of probability distribution is calculated by Equation (6).

$$\text{entropy} = -\sum_{i=0}^{i=7} Pb_i \times \log Pb_i \quad \text{Equation (6)}$$

The provided image processing systems can be implemented in video player devices, such as televisions, VCD players, DVD players, and the like, receiving a video signal and modifying the signal to achieve noise reduction and edge enhancement effects according to probabilities of edge existence measured in predetermined directions. The video player device then feeds the modified video signal to execute video signal processing, and displays or outputs the processed video signal.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image processing method providing noise reduction and edge enhancement for a video signal, comprising:
    extracting a plurality of pixels from the video signal;
    evaluating measures of edge existence in a plurality of directions within the extracted pixels;
    determining a level of variation from the measures of edge existence;
    mapping the level of variation to a first and second control signal in accordance with a predetermined function;
    performing noise reduction on the extracted pixels according to the first control signal; and
    performing edge enhancement on the extracted pixels according to the second control signal.

2. The image processing method according to claim 1, wherein the determining comprises calculating a difference between a maximum and a minimum value of the measures of edge existence, so that the level of variation results.

3. The image processing method according to claim 1, wherein the predetermined function is a non-increasing function.

4. The image processing method according to claim 1, wherein the first and the second control signals originate from an identical signal.

5. The image processing method according to claim 4, wherein the lower the level of variation, the greater the noise reduction and the less the edge enhancement on the extracted pixels.

6. The image processing method according to claim 4, wherein the predetermined function is of the form:

$$\frac{1}{\sqrt{1 + c \times v^2}},$$

where v denotes the level of variation and c is a constant.

7. The image processing method according to claim 6, wherein the first control signal is determined from:

$$\frac{1}{\sqrt{1 + c \times v^2}},$$

and the second control signal is determined from:

$$1 - \frac{1}{\sqrt{1 + c \times v^2}}.$$

8. The image processing method according to claim 1, wherein the determining comprises calculating entropy of the measures of edge existence, so that the level of variation results.

9. The image processing method according to claim 1, wherein the performing of edge enhancement is subsequent to the performing of the noise reduction.

10. A method of noise reduction and edge enhancement in image processing, comprising:
    extracting a plurality of pixels from a video signal;
    measuring an edge tendency within the extracted pixels;
    mapping the edge tendency to a control signal in accordance with a non-decreasing function;
    performing noise reduction on the extracted pixels according to the control signal; and
    performing edge enhancement on the extracted pixels according to the control signal.

11. The method of claim 10, wherein the measuring comprises:
    evaluating measures of edge existence in a plurality of directions within the extracted pixels; and
    determining a level of variation on the measures of edge existence, whereby the edge tendency is formed.

12. The method of claim 10, wherein the mapping comprises determining the control signal from a look-up table incorporating the non-decreasing function.

13. The method of claim 10, wherein the lower the edge tendency, the greater the noise reduction and the less the edge enhancement on the extracted pixels.

14. A method of noise reduction and edge enhancement in image processing, comprising:
    extracting a plurality of pixels from a video signal;
    measuring an edge tendency within the extracted pixels;

mapping the edge tendency to a first and second control signal in accordance with a predetermined function;

performing noise reduction on the extracted pixels according to the first control signal; and performing edge enhancement on the extracted pixels according to the second control signal.

15. The method of claim 14, wherein the measuring comprises:

evaluating measures of edge existence in a plurality of directions within the extracted pixels; and determining a level of variation on the measures of edge existence, whereby the edge tendency is formed.

16. The method of claim 14, wherein the mapping comprises determining the control signal from a look-up table incorporating the predetermined function.

17. The method of claim 14, wherein the first and the second control signals originate from an identical signal.

18. The method of claim 17, wherein the lower the edge tendency, the greater the noise reduction and the less the edge enhancement on the extracted pixels.

19. The method of claim 17, wherein the predetermined function is of the form:

$$\frac{1}{\sqrt{1+c \times v^2}},$$

where v denotes the level of variation and c is a constant.

20. The method of claim 19, wherein the first control signal is determined from:

$$\frac{1}{\sqrt{1+c \times v^2}},$$

and the second control signal is determined from:

$$1-\frac{1}{\sqrt{1+c \times v^2}}.$$

* * * * *